United States Patent
Steinich

(10) Patent No.: US 10,718,361 B2
(45) Date of Patent: Jul. 21, 2020

(54) SENSOR UNIT AND WORKING CYLINDER WITH A SENSOR UNIT

(71) Applicant: ASM Automation Sensorik Messtechnik GmbH, Moosinning (DE)

(72) Inventor: Klaus Manfred Steinich, Pöring (DE)

(73) Assignee: ASM Automation Sensorik Messtechnik GmbH, Moosinning (DE)

( * ) Notice: Subject to any disclaimer, the term of this patent is extended or adjusted under 35 U.S.C. 154(b) by 95 days.

(21) Appl. No.: 15/954,120

(22) Filed: Apr. 16, 2018

(65) Prior Publication Data
US 2018/0313371 A1 Nov. 1, 2018

(30) Foreign Application Priority Data
Apr. 26, 2017 (DE) .................. 10 2017 108 855

(51) Int. Cl.
F15B 15/28 (2006.01)
F15B 15/14 (2006.01)
G01D 5/14 (2006.01)
G01D 11/24 (2006.01)

(52) U.S. Cl.
CPC .......... F15B 15/2861 (2013.01); F15B 15/14 (2013.01); F15B 15/283 (2013.01); G01D 5/145 (2013.01); G01D 11/245 (2013.01)

(58) Field of Classification Search
CPC ...... F15B 15/283; F15B 15/2861; G01D 5/06
See application file for complete search history.

(56) References Cited

U.S. PATENT DOCUMENTS

| 7,290,476 | B1 * | 11/2007 | Glasson | F15B 15/283 33/763 |
| 2005/0160614 | A1 * | 7/2005 | Steinich | G01B 3/11 33/732 |
| 2006/0208726 | A1 * | 9/2006 | Mock | G01D 5/145 324/207.24 |
| 2008/0164866 | A1 * | 7/2008 | Steinich | G01D 5/08 324/207.2 |

(Continued)

FOREIGN PATENT DOCUMENTS

| DE | 19726084 | 2/1999 |
| DE | 102009042506 | 6/2011 |

(Continued)

*Primary Examiner* — Michael Leslie
*Assistant Examiner* — Matthew Wiblin
(74) *Attorney, Agent, or Firm* — Head, Johnson, Kachigian & Wilkinson, PC

(57) ABSTRACT

In order to arrange a sensor unit completely in an interior e.g. of a cylinder of a piston cylinder unit and in order to be able to use a tension element sensor as a sensor the sensor unit is configured so that it includes a pressure tight wall through which a magnetic field sensitive sensor is configured to detect a magnetic field of an encoder magnet that moves on another side of the pressure tight wall and represents a rotational position and rotations of the winding drum whereas a housing of the sensor unit is sealed relative to an interior of the cylinder so that the sensor cavity in which the sensor is arranged represents a low pressure cavity which is advantageously only subjected to ambient pressure. This avoids hollow boring of the piston rod and no magnetic field permeable window has to be fabricated in a wall or in a base of the cylinder.

12 Claims, 8 Drawing Sheets

(56) References Cited

U.S. PATENT DOCUMENTS

| | | | | |
|---|---|---|---|---|
| 2009/0027044 | A1* | 1/2009 | Hornung | G01D 5/06 |
| | | | | 324/207.2 |
| 2010/0050863 | A1* | 3/2010 | Wenker | F15B 15/2892 |
| | | | | 92/5 R |
| 2011/0067565 | A1* | 3/2011 | Steinich | F15B 1/24 |
| | | | | 92/5 R |
| 2011/0080162 | A1* | 4/2011 | Steinich | G01B 7/30 |
| | | | | 324/207.25 |

FOREIGN PATENT DOCUMENTS

| | | | |
|---|---|---|---|
| JP | 11336714 A * | 12/1999 | ............ F15B 15/283 |
| WO | WO2007088053 | 8/2007 | |

\* cited by examiner

US 10,718,361 B2

SENSOR UNIT AND WORKING CYLINDER WITH A SENSOR UNIT

FIELD OF THE INVENTION

The invention relates to a sensor unit or determining a position of an object which is arranged in an environment with problematic environmental conditions like e.g. high pressure and aggressive media.

A typical application is detecting a piston of the piston or of a piston rod in the cylinder of an operating cylinder unit

BACKGROUND OF THE INVENTION

The problem is not to arrange the sensor if possible at all in the space with the different environmental conditions subsequently generally designated as positive pressure space without limiting the difficult condition to a physical magnitude of the pressure so that damages to the sensor are prevented.

On the other hand side the operating cylinder unit shall require as few as possible additional features possibly no additional features for housing the sensor unit in order not to increase cost of the operating cylinder unit.

On the other hand side arranging portions of the sensor unit on an outside of the cylinder of the operating cylinder unit is disadvantageous since they can be damaged easily in the typically rough environment where the operating cylinder unit are being used for example in construction equipment that is exposed to the elements.

So far the following solutions are typical:

a) infrared ultrasound sensors:

touch free scanning and detecting of a distance of a face of the piston by an infrared ultra sound sensor arranged in an interior of the cylinder at an end.

Sensors of this type are rater sensitive and still expensive and measuring precision is limited.

b) tension element sensors:

a positive pressure cavity in an interior of the cylinder includes a typical measuring cable sensor or a measuring band sensor in which a cable or band that is wound onto a winding drum and preloaded in the wind up direction by a flat spiral spring is attached with the free end at the piston.

The number of revolutions and the angular position of the cable drum are detected and a pull off length of the cable and thus a position of the piston in the cylinder is determined.

The sensor detecting the revolutions and the angular position of the cable drum can also be arranged in the positive pressure cavity which however can lead to damaging the sensor element easily.

The rotation and rotational position of the winding drum however can also be transmitted touch free by a magnet connected to the winding drum through an accordingly configured portion in the cylinder wall to the magnetic field sensitive sensor arranged on an outside of the portion of the cylinder wall.

Thus however the cylinder typically made from a thick steel material has to be provided with a window either with a smaller material thickness or made from another e.g. magnetic field permeable material which increases the fabrication cost of the cylinder by a large amount and also reduces its pressure bearing capacity by a large amount.

c) rod-sensor units of the magneto astrictive type:

The sensor unit made from a head and a sensor rod axially protruding therefrom is installed at an axial end in the cylinder and sealed at an outer circumference relative to the inner circumference of the cylinder so that the sensor rod protrudes towards another end of the cylinder, typically in a center of the cylinder.

The piston rod is bored hollow so that the sensor rod can penetrate into the longitudinal bore hole in the piston rod.

The piston rod supports a typically annular encoder magnet at an end that is oriented towards the sensor head wherein a magnetic field of the encoder magnet influences an electrical signal running in the wave conductor in an interior of the sensor rod through a current axial position of the encoder magnet along the sensor rod and influences a density wave in the wave conductor that runs back to the sensor head. Thus the sensor element arranged in the sensor head and in a subsequent processing unit facilitates detecting an axial position of the encoder magnet and thus of the piston rod relative to the sensor rod and thus relative to the cylinder.

Thus the sensor head typically contacts a shoulder proximal to the cylinder base. The data transfer from the sensor head that is typically performed by a cable is provided by a cable outlet from the sensor head on an ambient pressure side oriented away from the piston and a pass through opening in the cylinder typically arranged in a base of the cylinder.

The required complex hollow boring of the piston rod is a distinct disadvantage.

BRIEF SUMMARY OF THE INVENTION a) Technical Object

Thus it is an object of the invention to provide a solution where a risk of damaging the sensor unit, in particular the sensor is low and in particular preparation complexity at the operating cylinder unit for an installation of the sensor unit is reduced.

b) Solution

This object is achieved by the features of claims 1 and 11. Advantageous embodiment can be derived from the dependent claims.

A sensor unit according to the invention includes a known tension element travel distance sensor wherein an end of the tension element typically a cable or band, e.g. a metal band is attached on a circumference of a winding drum that is preloaded by a spring, thus a flat spiral spring in the wind up direction and substantially wound onto the wind up drum in the starting condition, wherein the free end of the tension element is attached at the object whose position relative to the sensor unit shall be detected.

A suitable sensor is used to measure complete or partial revolutions of the winding drum starting with the starting position, thus e.g. one of the end positions of the object to be measured and a pull off length of the tension element is computed form the revolutions by a processing unit.

Advantageously the sensor is not mechanically coupled with the winding drum, in particular its axis, but coupled touch free in that in particular an encoder magnet is operationally connected with the wind up drum so that the encoder magnet reflects the revolutions of the wind up drum and is attached in the simplest case on a face of the wind up drum remote from its axis.

Opposite from the encoder magnet without contacting the encoder magnet and separated therefrom by a wall that is tight at least with respect to the problematic environmental conditions in which the tension element travel distance sensor is arranged, advantageously a pressure tight, better also pressure resistant wall, a magnetic field sensitive sensor is arranged in a magnetic effective range of the encoder magnet, wherein the pressure tight wall is configured so that the magnetic field of the encoder magnet and in particular its change is detected and measured by the magnetic field sensitive sensor.

It is appreciated that the in particular pressure tight wall does not have to be the entire wall for example of a housing but can also be a merely integral section of the wall or also a separate plate which seals a pass through opening in the wall tight.

Advantageously the wall is made from a non-magnetize able material e.g. plastic or aluminum or from a magnetize able material which can also be magnetically saturated by the magnetic field of the encoder magnet ant thus becomes so to speak magnetic field permeable in that it copies magnetic field changes and thus functions as a quasi-secondary encoder magnet.

Thus in the sensor unit according to the invention the sensor and optionally the electronic processing unit for the signals of the sensor are arranged on one side of the in particular pressure tight wall, the winding drum, the flat spiral spring and the tension element wound onto the winding drum however are arranged on the other side of the wall.

Thus is appreciated that "pressure tight" indicates that the wall is configured to prevent a balancing of different pressures that are provided on the two sides of the wall.

"Pressure tight" shall be interpreted so that the wall is not deformed by the pressure difference between the two different pressures on both sides like e.g. a membrane but essentially maintains an unchanged shape.

Thus, the sensor unit includes a housing at least on one side of the pressure tight wall, thus a sensor housing for the sensor and optionally a processing circuit and/or a mechanical housing for arranging the winding drum, the wound up tension element in the spring that preloads the winding drum, in particular a flat spiral spring that is advantageously arrange din an interior of the winding drum and the encoder magnet.

The wall then forms part of the divider wall either of the sensor housing or of the mechanical housing and advantageously the wall is an integral portion of one of the two housings, only rarely a separate component.

Neither the sensor housing nor the mechanical housing have to be closed completely but typically include at least one open side through which the components can be introduced into an interior of the respective housing. In particular the sensor housing can be made only from a plate in which for example also the in particular pressure tight wall can be arranged, wherein the sensor can be attached at or proximal to the plate, in particular the pressure tight wall.

It is essential for a sensor unit of this type to seal the sensor unit relative to an enveloping component, in particular the cylinder of an operating cylinder unit in a way so that the sensor cavity and thus the sensor arranged therein is not loaded by the operating pressure of the cylinder, thus the sensor cavity is advantageously only exposed to ambient pressure or a pressure that is low enough so that it cannot cause any damages to the sensor or the other components that are arranged in the sensor cavity.

Advantageously a circumferential pressure tight first seal is provided on an outside. In particular the outer circumferential surface of the sensor unit housing.

When there is only the sensor housing this seal is arranged at the sensor housing. When there is only the mechanical housing the first seal is arranged at the mechanical housing.

When both housings are provided the seal is arranged at one of the two housings.

Or the two housings form a combined housing the so called unit housing in that they are e.g. attached at each other and can be handled together and then the first seal can be arranged on the outside, in particular the outer circumferential surface of the entire housing and can then extend also over the contact plane between the two housings, in particular the plane of the tight, in particular pressure tight wall.

Then however also the gap between the mechanical housing and the sensor housing has to be sealed additionally.

Since a sensor unit of this type is advantageously provided for use in an operating cylinder unit. A combined housing of this type advantageously has a circular cross sectional contour and in particular a cylindrical shape.

When a sensor unit of this type is used and positioned in an interior of the cylinder of an operating cylinder unit the first seal contacts an inner circumference of the cylinder tight and divides an inner cavity of the cylinder into two pressure cavities wherein a space in which the sensor and operationally the associated processing unit are arranged in particular the interior of the sensor housing is connected with a pressure cavity that is advantageously loaded by ambient pressure, the so called low pressure cavity.

On the other hand side the mechanical components of the sensor thus the winding drum. Thus, the winding drum the wound up band or cable, the encoder magnet and the spring in particular the flat spiral spring are loaded by the pressure of the other pressure cavity and if there is a mechanical housing the mechanical housing is connected with this other pressure cavity which is loaded within the operating cylinder unit typically with the operating pressure of the operating cylinder unit.

The seal plane which extends through the circumferential first seal can be arranged differently with respect to the wall plane of the in particular pressure tight wall. Thus the seal plane can be arranged parallel to the wall, in case both housings are provided the sensor housing adjoins axially to the mechanical housing.

The seal plane can also be at an angle, for example at a right angle to the wall plane wherein the sensor housing and the mechanical housing are then arranged adjacent to each other in the axial direction.

It is also appreciated that the rotation axis of the winding drum is arranged transversal to the axial direction of which is the movement direction of the piston in the cylinder and/or a direction that is perpendicular to the typically circular circumferential contour of the sensor unit, however when these two directions are parallel an additional deflection of the tension element, thus of the band is required from the pull off direction from the winding drum into the axial direction.

Thus it shall also be clarified that sensor housing and/or mechanical housing can be formed in this case respectively by a simple flat or 3 dimensionally cambered or angled plate at which the components are arranged on one side which are to be arranged in the mechanical cavity and in the sensor space on the other side.

A plate of this type can form or include for example the pressure tight wall if the wall continues to the first seal and thus forms a pressure tight barrier together with the seal wherein on one side of the pressure tight barrier the mechanical components are arranged and on another side of the barrier the sensor and optionally the processing circuit is arranged.

Merely for reasons of mechanical protection the respective housing, thus the sensor housing and/or the mechanical housing do not only include a plate of this type, quasi as a base plate, but additionally also at least side walls and optionally also a substantially closed rear wall.

Transmitting signals determined by the sensor can be done wirelessly in that the sensor includes a transmitter for the signals which transmitter can in particular also penetrate a surrounding component like e.g. the wall of the cylinder of the operating cylinder unit.

Typically however electrical conductors, thus cables will run away from the sensor, wherein the cables are advantageously run out from the sensor housing through a cable outlet, wherein the cable outlet is arranged in particular in the face of the sensor housing.

The cables advantageously terminate in a plug element which can be attached for example in a pass through of the surrounding cylinder.

With respect to the operating cylinder unit that includes a cylinder and a piston that is move able therein tightly sealed and/or a piston rod, the object is achieved in that a sensor unit as described supra is arranged in the cylinder, advantageously in an end portion of the cylinder so that the sensor unit is thus completely arranged within the cylinder besides maybe a cable that is run out.

Since the first seal contacts an inner surface of the cylinder tight an interior space of the cylinder is thus divided into two cylinder cavities that are separated from each other pressure tight, wherein a first cylinder cavity, the high pressure cavity is loaded by the operating pressure of the operating cylinder unit, the second cylinder space however has a different pressure level and is connected in particular with the ambient outside of the cylinder thus is only exposed to ambient pressure and designated as low pressure cavity.

Thus, the sensor cavity of the sensor unit is part of the lower pressure cavity or connected therewith whereas the mechanical components (winding drum, tension element, spring, encoder magnet) are arranged in the high pressure cavity and are loaded with the operating pressure, in particular in that they are arranged in thus a mechanical cavity of a mechanical housing wherein the mechanical cavity is connected with the high pressure cavity.

Thus, there is the problem in practical applications that the pressure tight wall between the encoder element, in particular the encoder magnet and the sensor has to withstand very high pressures of up to 1000 bar so that the surface of the wall has to be kept as small as possible in order to withstand these pressure in spite of a small wall thickness.

If the signals generated by the sensor are run outward by cables the signals terminate at one end of the cable that is connected with the sensor or its processing unit in a plug element which is arranged in a corresponding pass through of the cylinder wall or of the cylinder base or they run through a cable pass through that is arranged at this location.

This embodiment of the sensor unit and/or of the operating cylinder unit has the great advantage that the sensor unit can be introduced into any cylinder when in particular a diameter of the sensor unit is sized accordingly, wherein the cylinder was configured so far for receiving the head of a magneto astrictive rod sensor unit so that no cylinders are required that are shaped differently.

However when producing the associated piston rods boring the piston rods hollow can be omitted which significantly reduces a cost of producing the piston rods.

In spite of that the sensor and the processing unit are neither on an outside of the cylinder nor in an interior of the cylinder in the high pressure cavity that is loaded with the operating pressure where the sensor and the processing unit would be damaged prone.

c) EMBODIMENTS

Embodiment of the invention are subsequently described in more detail with reference to drawing figures, wherein:

FIG. 1a illustrates a first embodiment of the sensor unit installed in an operating cylinder unit in a longitudinal sectional view through the operating cylinder unit;

FIG. 1b, c illustrates cross sections through operating cylinder units with sensor units arranged therein;

FIG. 1d illustrates a second embodiment of a sensor unit in an illustration analogous to FIG. 1a;

FIG. 2 illustrates a third embodiment of a sensor unit in a representation analogous to FIG. 1a;

FIG. 3 illustrates a fourth embodiment of a sensor unit in a representation that is analogous to FIG. 1a;

FIG. 4 illustrates a fifth embodiment in a sensor unit in a representation that is analogous to FIG. 1a.

Figure 1A:
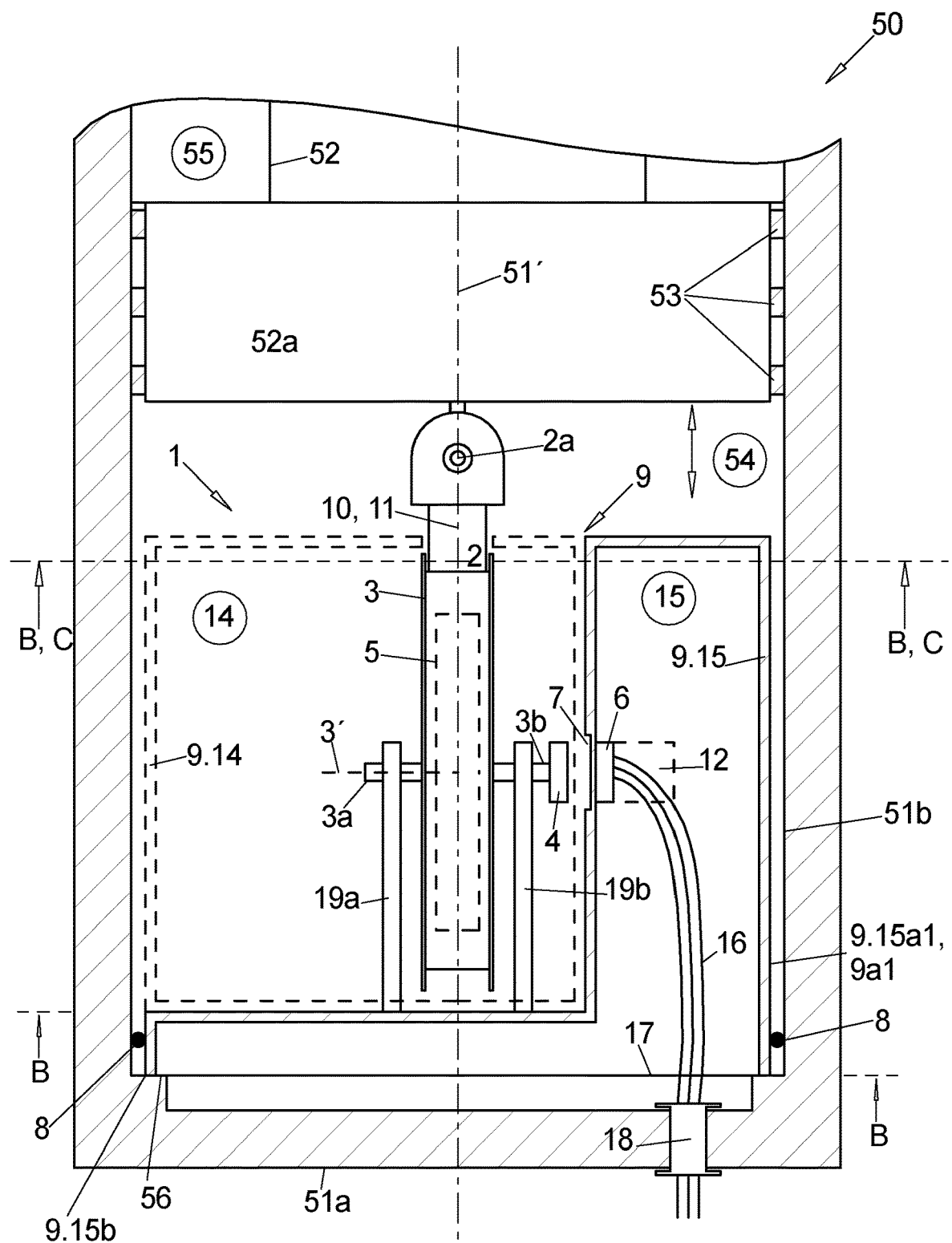

In all representations the sensor unit 1 is illustrated in an interior of an operating cylinder unit 50 in order to detect the position of the piston 52a in the cylinder 51 in an axial direction 51'.

The piston 52a that is axially move able sealed tight along an inner surface 51a of the wall of the cylinder 51 encloses a cylinder cavity 54 together with the cylinder 51 and in particular its cylinder base 51', wherein the cylinder cavity is typically loaded with the pressure medium and designated as the pressure cavity 55.

The other cylinder cavity 55 on the other side of the piston 52a in case this other cylinder cavity is provided and which is connected to ambient pressure a thus designated as low pressure cavity 55 when the operating cylinder unit 50 is only loadable with pressure.

An operating cylinder unit 50 with a piston 52 is illustrated herein, wherein the piston is arranged at a free end of a piston rod 52 wherein the piston rod has a smaller cross section than the piston 52a and wherein only the piston 52a with its typically provided circumferential piston rings 53 contacts an inner surface 51a of the cylinder 51 sealed tight.

Instead the operating cylinder unit however can also operate according to the plunger principle wherein the operating cylinder unit only includes the piston rod 52 and no piston 52a with a larger diameter and wherein the piston rod 52 slides along sealed tight at an end of the cylinder 51 that is opposite to the illustrated end at a piston rod seal in an inner circumferential surface of the cylinder outlet.

The pressure cavity 54 then extends up to this piston rod seal, wherein this embodiment of the operating cylinder unit is only loadable with the pressure medium on one side.

It shall be furthermore clarified that the sensor unit 1 that is positioned in the drawings in the pressure cavity 54 and supported at the cylinder base 51a, namely at a shoulder 56 provided at this location can be arranged as a matter of principle also in the opposite low pressure cavity 55 if sufficient space is available for this purpose adjacent to the piston rod 52 which however typically is not the case.

In order to clarify the essential advantage of the operating cylinder unit 50 for a manufacturer the prior art solution which is being widely used since it is very reliable will now be described with reference to FIG. 5.

Thus a rod sensor unit 30 is used which has a sensor head 21 that has a cylindrical cross section which fits into the cylinder 51 and from whose first face a sensor rod 32 protrudes typically at a central location wherein the sensor rod is much thinner and also much longer in the axial direction than the sensor head 31 but which typically also has a cylindrical cross section.

Functionally speaking this is typically a magneto astrictive wave conductor sensor where a non-illustrated wave conductor wire extends in the sensor rod 32 which is configured hollow like the sensor head 31 wherein an electrical impulse can be introduced into the wave conductor wire by the sensor head, wherein the impulse is influenced at a location where an encoder magnet is arranged that is closely adjacent to the sensor rod but outside of the sensor rod so that a magneto elastic density wave is generated at this location. The density wave expands on the wave conductor and thus also runs back to the sensor head 31 and can be detected there with respect to its run time, wherein the distance of the triggering encoder magnet 4 which is permanently connected in the axial direction 51' with the piston of the piston rod can be determined by the sensor head.

For this purpose the cylinder 51 of the operating cylinder unit 50 is extended by the manufacturer in order to accommodate the additional length of the sensor head 31 therein and is optionally configured with the corresponding shoulder proximal to the cylinder base 51a as a stop for the cylinder head 31 wherein the cylinder head 31 is inserted into the cylinder 51 and sealed relative to the its inner surface 51a by a seal 8 that envelops an outer circumferential surface of the sensor head 31.

Thus the cables protruding from the sensor head 31 on a face that is oriented away from the sensor rod 32 can be run out through a cable outlet 17 or a plug element 18 through the cylinder base 51' since the portion between the seal 8 and the cylinder base 51' is not loaded by the operating pressure of the cylinder space 54, the pressure cavity.

According to this solution the sensor rod 32 protrudes into a piston bore hole 33 and thus into the piston. The piston borehole 33 is introduced from the free face of the piston 52a and continues according to a length of the sensor rod 32 into the piston rod 52, so that the piston 52 still overlaps with the sensor rod 32 in the axial direction in a completely forward position of the piston 52a in a direction towards the cylinder base 51a as well as in a completely retracted position of the piston in the axial direction 51'. The encoder magnet 4 typically configured as an annular magnet is typically arranged at the front free end of the piston 52a about the piston bore hole 33.

This solution is quite common because the entire rod-sensor unit 30 is arranged well protected in an interior of the cylinder 51 and in view of the typically rough environmental conditions when the operating cylinder unit 50 is freely accessible at a piece of construction equipment like e.g. a front end loader cannot be damaged.

The great disadvantage is that the piston rod 52 has to be drilled hollow in the axial direction with a very long and rather thin bore hole which is difficult to produce and expensive due to the long slender drill not the least due to high tool wear.

The solution according to the invention overcomes this disadvantage in that the operating cylinder unit 50 with unchanged cylinder 51 with respect to length and configuration in the base end portion can be used however. The employed piston rod 52 cannot be drilled hollow.

Figure 5:
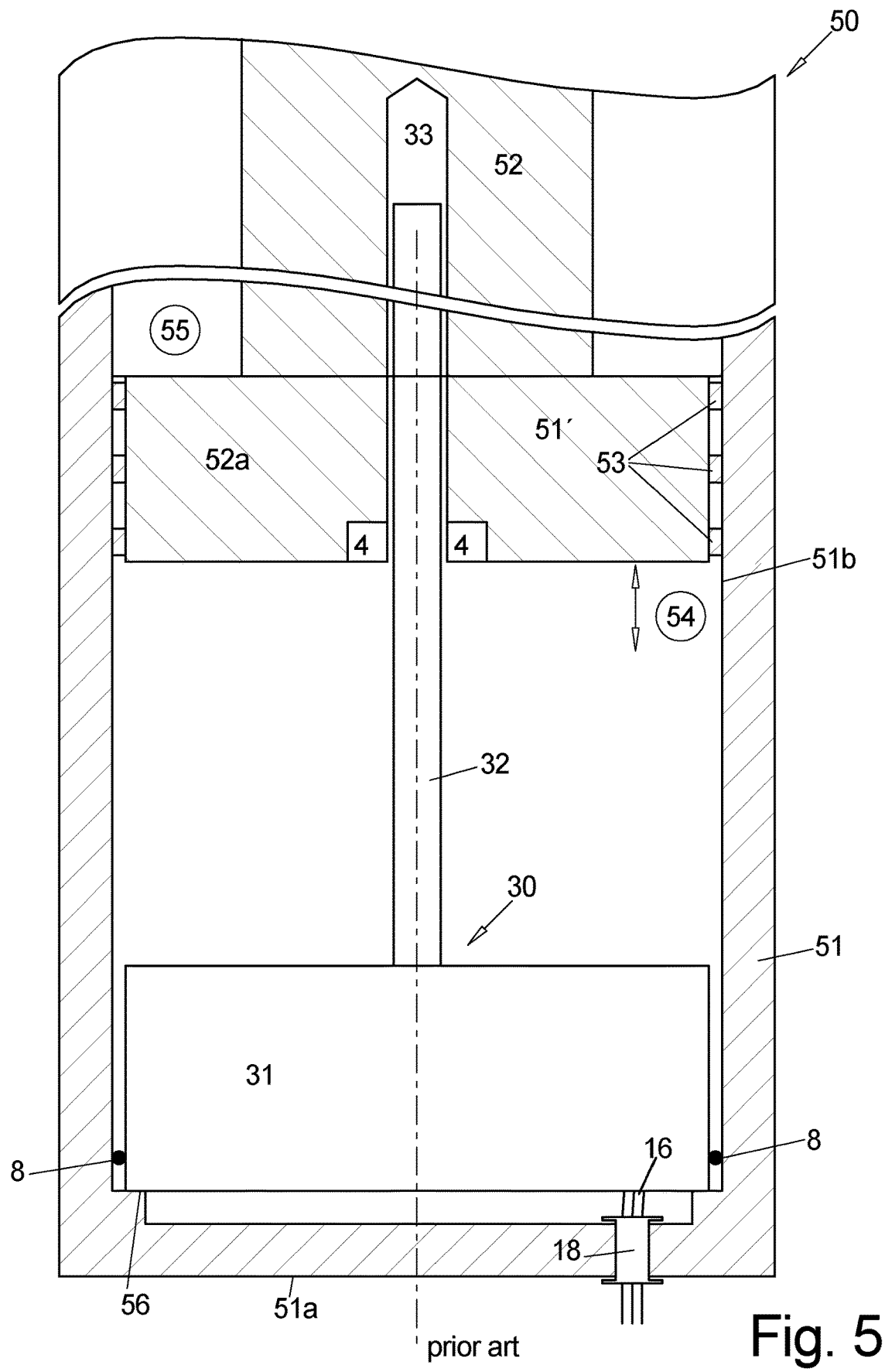
FIG. 5 illustrates a prior art solution which can be replaced by embodiments according to the invention according to FIGS. 1a—4.

This is achieved in that the position of the piston 52a and/or of the piston rod 52 according to FIGS. 1a, d, e and 2-4 is not measured touch free in the cylinder 51 like in the known solution according to FIG. 5, but with contact in that the free end of the tension element 2, herein of a band 2 of a known tension element sensor is attached at the piston 52a thus e.g. at a free face of the piston 52a.

Thus as it is well known in principle the rotation is detected with respect to number of revolutions and partial revolutions of the winding drum 3 by a sensor 6 and computed into a pull of length of the tension element 2 by corresponding processing electronics which are typically part of the sensor 6.

The particular feature of the invention that the sensor 6 is mechanically separated from the winding drum 3 and only connected touch free therewith so that it becomes possible to arrange there between a wall 7 between the winding drum 3 and the sensor 6 wherein the wall is tight, in particular pressure tight and even better pressure resistant and thus not deformed by the pressure.

Thus, the sensor 6 is also arranged in an interior of the cylinder 51 and the pressure tight wall 7 does not have to be part of the wall or of the base of the cylinder 51 but forms an element of the sensor unit 1 so that the cylinder 51 does not require a particular configuration with this respect and the sensor 6 also does not have to be arranged on the outside of the cylinder 51 where it is at risk of being damaged.

The touch free operating connection of the sensor 6 with the winding drum 3 and it rotation is provided magnetically in the instant embodiment. For this purpose the sensor 6 is a magnetic field sensitive sensor e.g. a Hall sensor wherein a move able encoder magnet 4 is arranged opposite to the sensor 6 with respect to the pressure tight wall 7, wherein the encoder magnet rotates advantageously in a plane parallel to the main plane of the pressure tight wall 7 and is mechanically coupled with the winding drum 3 so that the rotation of the encoder magnet 4 reflects the rotation of the winding drum 3, wherein the encoder magnet 4 does not have to rotate synchronous with the winding drum 3 as described with reference to FIG. 1d.

The winding drum 3 as is generally known is preloaded in the winding direction of the tension element 2 thus of the band 2 by a flat spiral spring 5 that is arranged in an interior of the winding drum 3. The winding drum 3 is supported by its face side protruding support pinion in a respective support block 19a, b.

Figure 3:
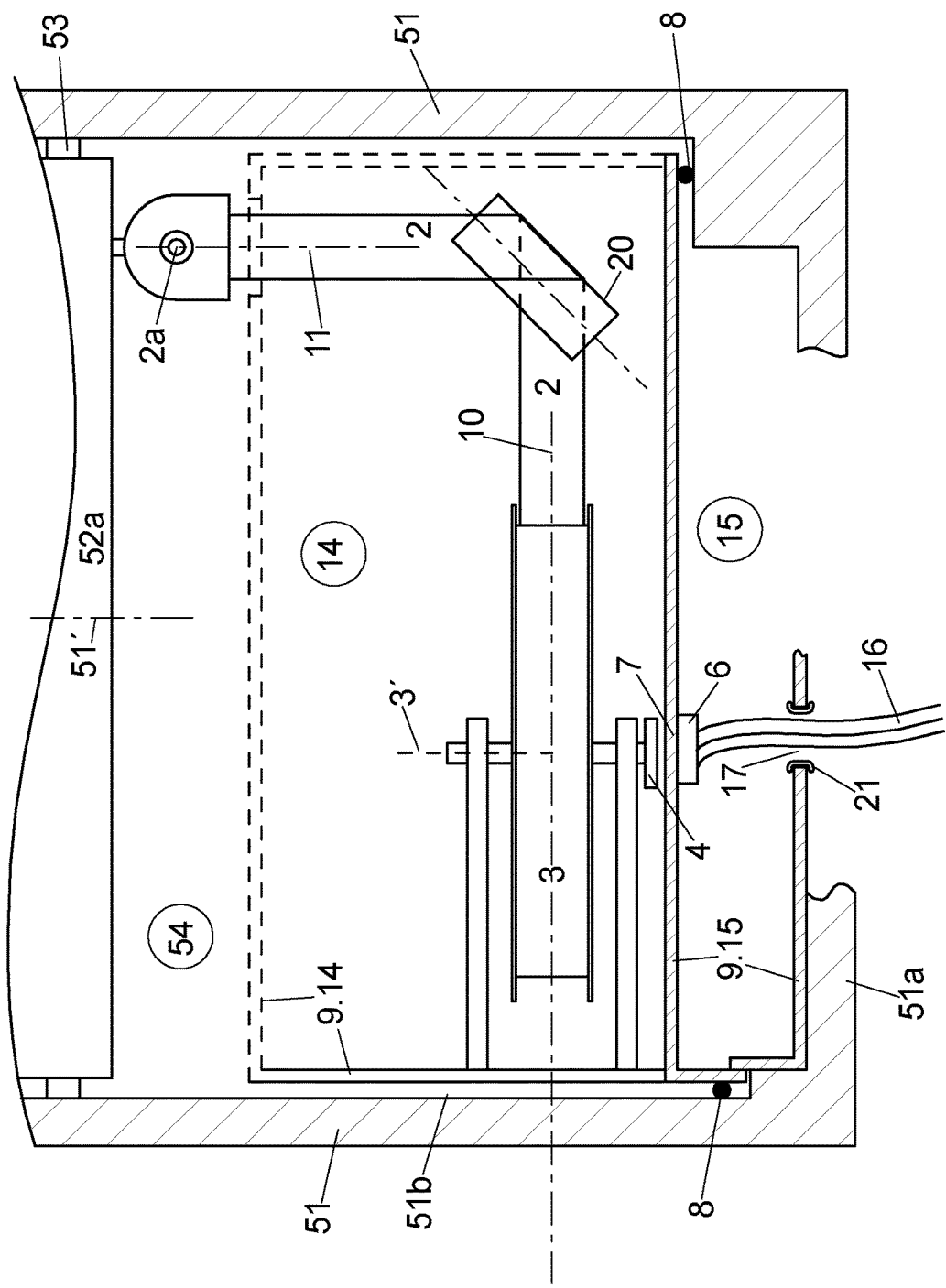
Figure 4:
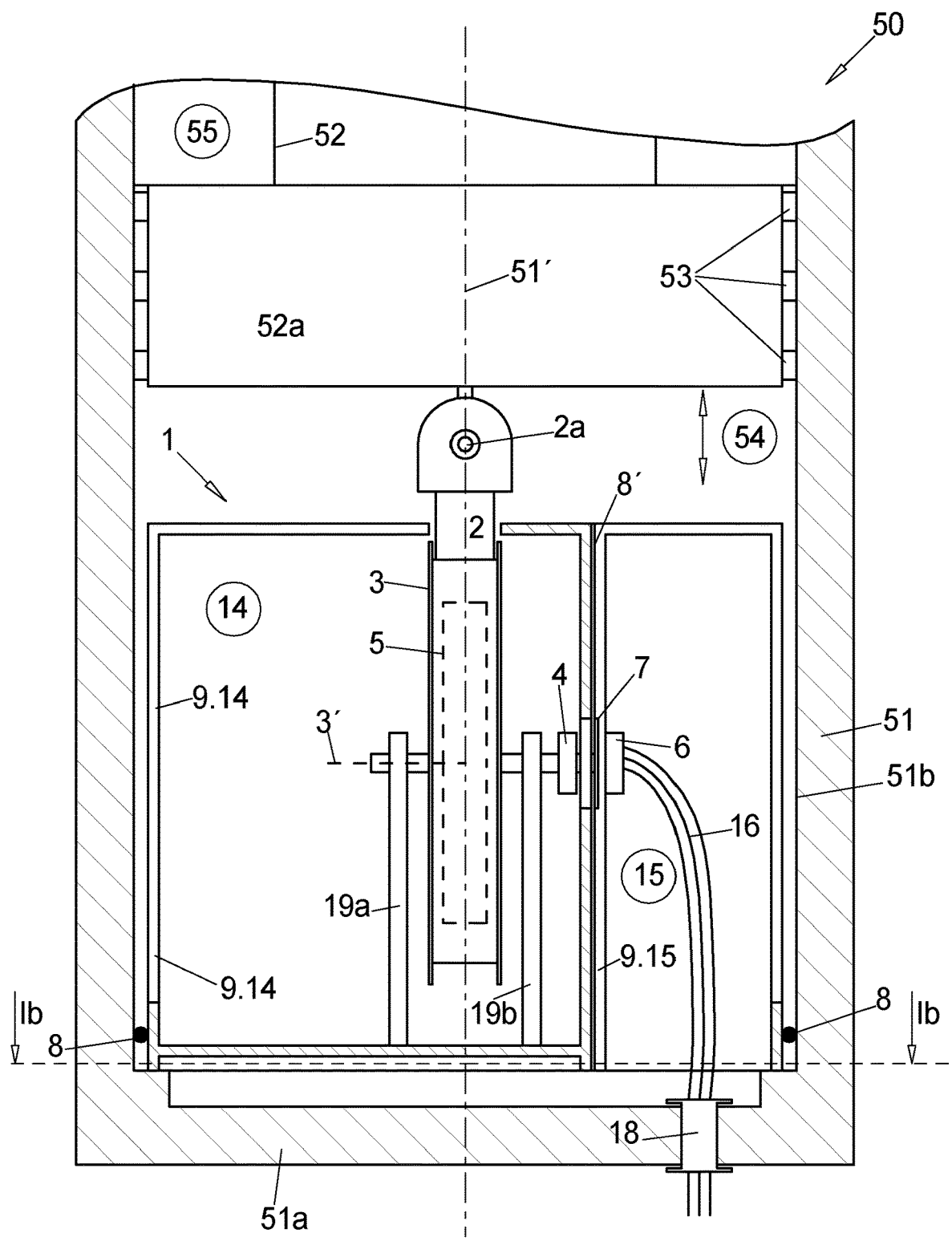

FIGS. 1a and 3-4 illustrate the encoder magnet 4 directly arranged on the free end of one of the bearing pinions 3a, b closely adjacent to the pressure tight wall 7 and opposite to the sensor 6.

The pressure tight wall 7 that is permeable for the signals required by the sensor 6 provides a separation into
a sensor cavity 15 in which the sensor 6 is arranged, and
a mechanical cavity 14 in which the encoder magnet 4, the winding drum 3, the flat spiral spring 5 and the tension element 2 are arranged.

The illustrated embodiment of the sensor unit 1 differ e.g. by
the housing configuration of the sensor unit 1,
the association of the pressure tight wall 7 with the individual housing elements, and
the orientation of the pull off direction 10 of the tension element 2 from the winding drum 3 with respect to the axial direction 51', thus the movement direction of the piston rod 52 and thus of the piston 52a in the cylinder 51.

In the first embodiment according to FIG. 1a the housing of the sensor unit 1, the so called unit housing 9 includes at least one sensor housing 9.15 in whose interior the sensor cavity 15 is arranged.

Figure 2:
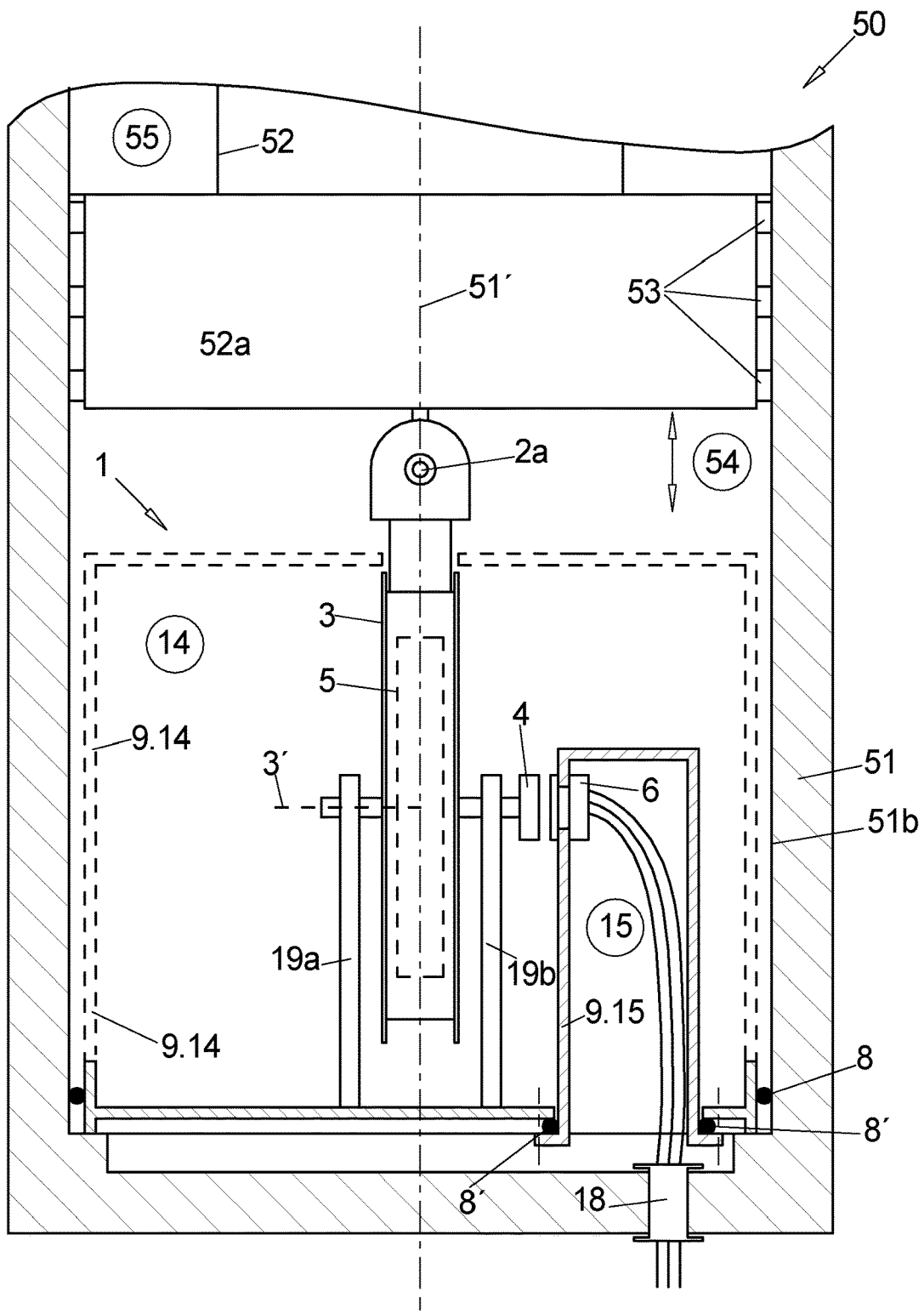

The pressure tight wall 7 is in this case part, advantageously an integral component of the sensor housing 9.15 and forms a section with reduced wall thickness e.g. compared to a rest of the sensor housing 9.15. This however could also be a separate component which is inserted pressure tight into an opening of the sensor housing 9.15 or which covers this opening pressure tight as illustrated in FIG. 2.

The sensor 6 is advantageously arranged directly at the pressure tight wall 7 or at the enveloping portion of the sensor housing 9.15.

The sensor housing 9.15 is configured pot shaped in that it is completely open on one side according to FIG. 1a, namely on a side that is oriented towards the cylinder base 51a.

The freely circumferential face 9.15b of the sensor housing 9.15, that is oriented towards the cylinder base 51a is supported at a shoulder 56 of the piston base 51' where the sensor head 31 is supported e.g. when a conventional solution according to FIG. 5 is installed and which is therefore typically already provided in the piston base 51' as a standard.

In the side view of FIG. 1a the sensor housing 9.14 has a base portion whose circumferential surface has the shape and approximately the diameter of the inner circumferential surface 51b of the wall of the cylinder 51 so that only the circumferential seal 8 fits there between.

An axial protrusion of the sensor housing 9.15 extends in a direction towards the piston 52a from the base element of the sensor housing 9.15 over a portion of the cross section and the sensor 6 is arranged in this protrusion and also the wall 7 is arranged in or at a section of the wall of the housing protrusion that extends in the axial direction 51' wherein the wall of the housing protrusion is not the wall of the sensor housing 9.15 that is adjacent to the wall of the cylinder 51.

The mechanical portion of the sensor unit thus in particular the winding drum 3, the flat spiral spring 5, the encoder magnet 4 the bearing blocks 19 and the tension element, in particular the band 2 are arranged adjacent to the axial housing protrusion of the sensor housing 9.15 in a transversal direction to the axial direction 51' in a portion of the cross section of the inner cavity of the cylinder 51 which is not filled by the axial housing protrusion.

These components can be mounted directly at the sensor housing 9.15, thus on a housing section that extends transversal to the axial direction 51' remote from the axial housing protrusion.

These mechanical components, however, can also be arranged in a separate mechanical housing 19.14 which is advantageously attached at the sensor housing 9.15 and which then certainly has to have an outlet opening oriented in a direction towards the piston 52a for passing the pulled off portion of the tension element through in particular of the band 2 whose free end is attached e.g. by an attachment eyelet 2a at the piston 52a.

Independently therefrom since this outlet opening for the band 2 is not provided pressure tight the recited mechanical components 2, 3, 4, 5 are thus all arranged in the pressure cavity 54 of the operating cylinder 50 wherein the pressure cavity 54 is a high pressure cavity. An additional mechanical housing 9.14 is thus used primarily for mechanically protecting the mechanical components in particular during handling and installation into the operating cylinder unit 50, however an identical pressure like in the pressure cavity 54 is provided within the mechanical housing 9.14.

Figure 1B:
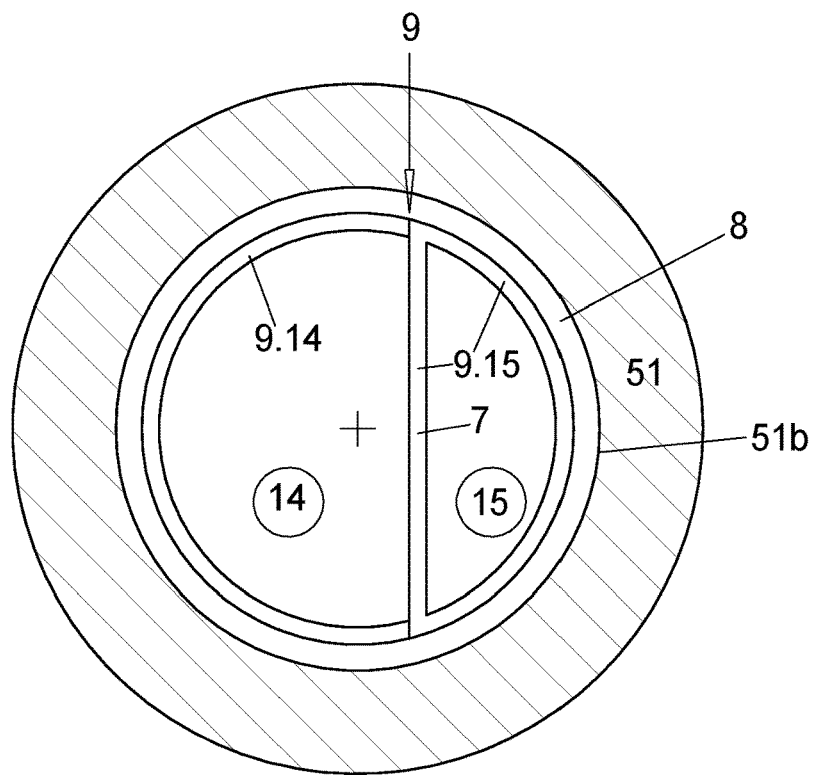

FIG. 1b illustrates a cross section through the operating cylinder unit 50 according to FIG. 1a which illustrates that the cylinder 51 has a circular cross section on an inside and on an outside and by the same token the unit housing that includes the sensor housing 9.15 and the mechanical housing 9.14 and accordingly also the circumferential seal 8 for example an O-ring seal that is arranged between the unit housing 9 or also only the sensor housing 9.15 and its base portion and the wall of the cylinder 51.

Figure 1C:
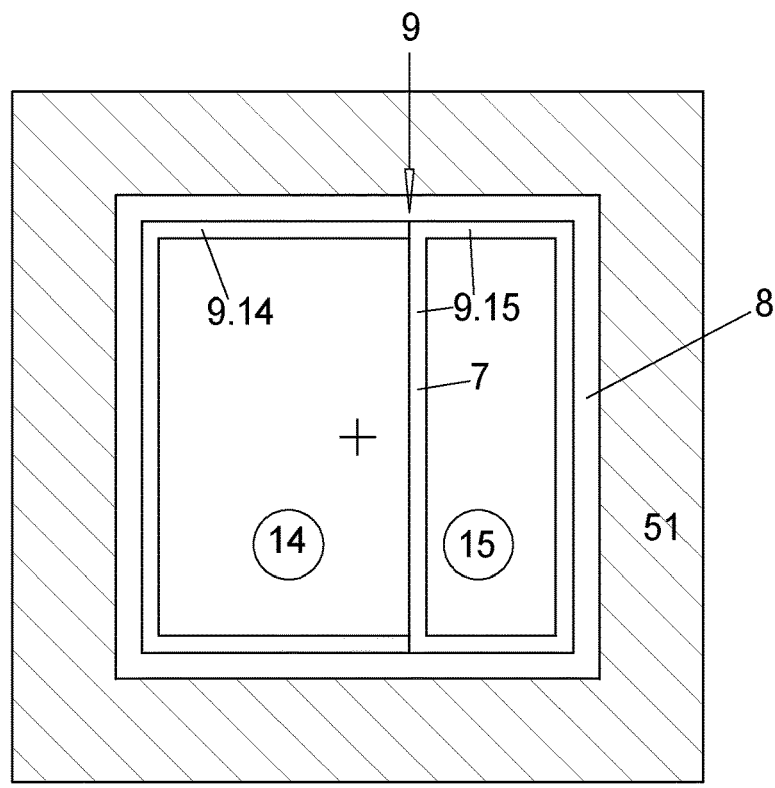

FIG. 1c illustrates a cross section through another non-typical namely rectangular configuration of a cylinder 51 with a corresponding shape of the unit housing 9 and of the seal 8 there between in order to show that the invention is not limited to circular cylindrical cross sections of the cylinder 51 as well as of the sensor unit 1 and in particular of its unit housing 9.

Figure 1D:
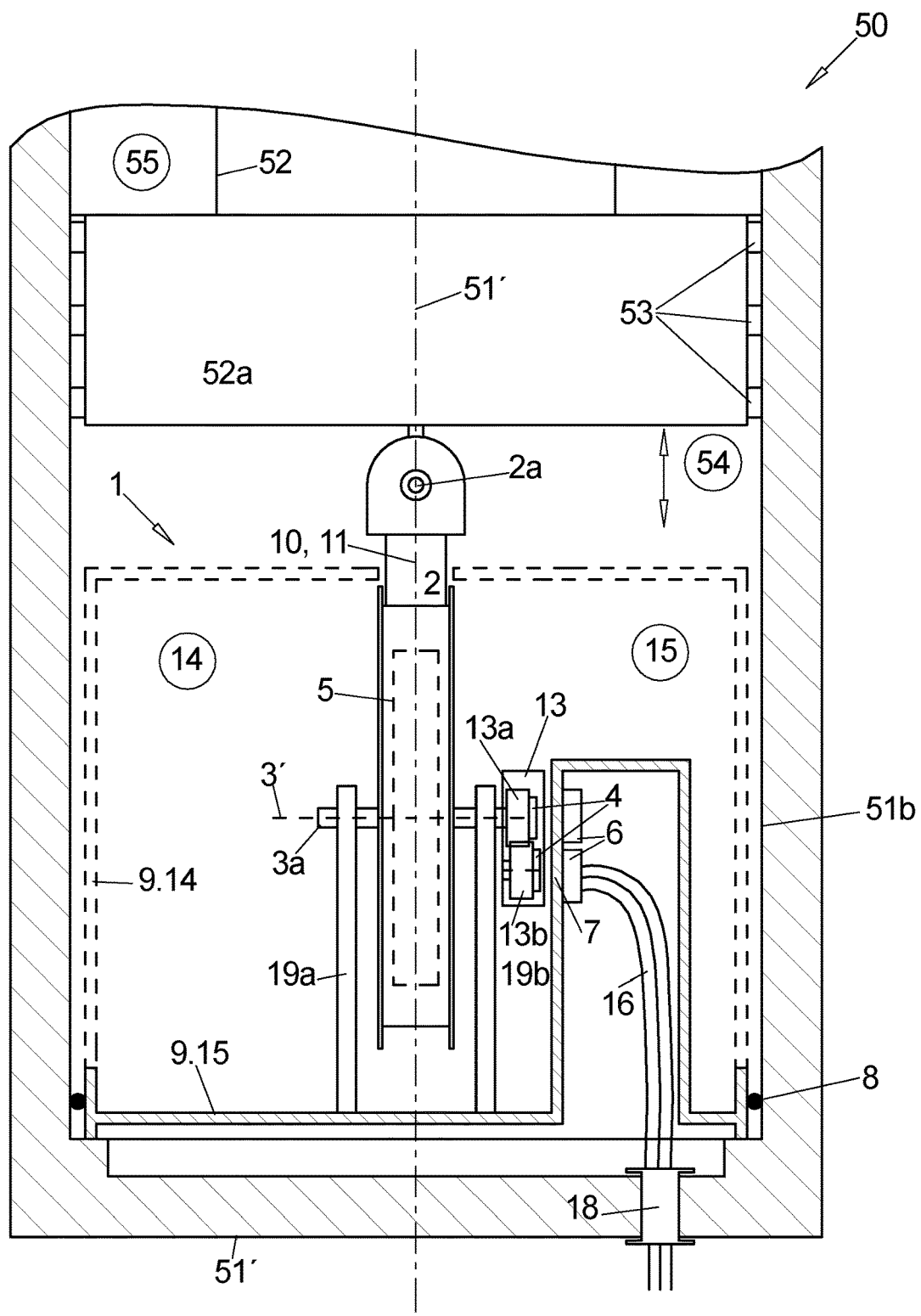

The second embodiment of FIG. 1d differs from the first embodiment according to FIG. 1a in that the axial protrusion of the sensor housing 9.15 in the cross sectional representation according to FIG. 1b does not reach to an outer edge of the unit housing 9 and forms its outer circumferential wall in portions but is offset in a direction towards a longitudinal center of the unit housing 9 so that the outer wall of a mechanical housing 9.14 is arranged about the protrusion wherein the outer wall then reaches with its outer circumference close to an inner circumference of the inner circumferential surface 51a of the cylinder 51.

Then there is an option to seal either the mechanical sensor housing 9.15 or the mechanical housing 9.14 relative to the cylinder 51 by the circumferential 8, wherein the latter case requires additional sealing of the sensor housing 9.15 relative to the mechanical housing 9.14 as described infra with reference to FIG. 2.

FIG. 1d furthermore includes a particularity which is also useable for any other embodiment that the encode magnet 4 is not directly connected torque proof with the shaft 3a of the winding drum 3, thus in particular its bearing pinion 3a, b but so that a transmission 13 is arranged there between.

In this case the transmission 13 is configured so that it includes 2 gears 3a, b that mesh with each other wherein one gear is connected torque proof with one of the bearing pinion 3b of the winding drum 3 and the other gear 13b meshing therewith centrally supports the encoder magnet 4 at a face that is oriented towards the pressure tight wall 7.

The encoder magnet 4 is thus connected torque proof with the second gear 13b which has another effective diameter and/or another umber of teeth compared to the first gear 13a which defines in particular the measurement precision thus the resolution of the sensor unit 1 through selecting a transmission ratio of the transmission 13.

The transmission 13 is arranged close enough to the pressure tight wall 7 so that the sensor 6 that is arranged on the other side is still arranged in the magnet field of the encoder magnet 4.

FIG. 1d however shows the additional feature where an additional encoder magnet 4 is arranged on a face of the first gear 13a and an additional sensor 6 is arranged in associated opposite to the additional encode magnet 4 on another side of the wall 7.

Since the two gears 13a, b differ only slightly with respect to their effective diameters and advantageously the numbers of teeth only differ by one tooth comparing the signals of the two sensors 6 facilitates on the one hand side a very high measurement resolution and on the other hand side measuring a quasi-unlimited number of revolutions of the winding drum.

The third embodiment according to FIG. 2 differs from the first embodiment according to FIG. 1a in that a mechanical housing 9.14 is provided even when it only includes essentially a base plate that is arranged transversal to the axial direction 51' but has an outer circumference at one location wherein the outer circumference corresponds to a shape of an inner circumferential surface 51b of the cylinder 51 and it only slightly smaller so that a seal 8 that is arranged there between seals in this case the outer circumferential surface of the mechanical housing 9.14 relative to the cylinder 51.

The mechanical unit is arranged therein which is configured analogous to FIG. 1a.

In turn with the rotation axis 3' of the winding drum advantageously perpendicular to the axial direction 51', the movement direction of the piston 52.

In this case the mechanical housing 9.14 includes a pass through in to which a pot shaped sensor housing 9.15 is insert able, in particular axially insert able whose wall 7 is at least configured pressure tight at least in sections wherein the wall is arranged opposite to the encode magnet 4 that is arranged in the mechanical cavity 14 in an inserted condition of the sensor housing 9.15 and wherein the sensor 6 is arranged in the sensor cavity 15 on an opposite inside side of the wall 7.

The pressure tight wall 7 is thus configure as a separate component that is applied tight to an opening of the sensor housing 9.15.

In order for the sensor cavity 15 to be separated pressure tight from the mechanical cavity 14 and thus the pressure cavity 54 of the operating cylinder unit 50 the sensor housing 9.15 has to be sealed relative to the mechanical housing 9.14 which is performed in this case in that the pot shaped sensor housing 9.15 has an outward protruding rim on an open side wherein the outward protruding rim is sealed relative to a bottom side, in this case the base plate of the mechanical housing 9.14 by a circumferential second seal 8' inserted there between.

FIG. 3 illustrates a fourth embodiment in which in turn the mechanical housing which can also be a plate extending only in a transversal direction to the axial direction 51' is sealed by the circumferential direction 8 relative to the cylinder 51.

In the left image half this is in turn a circumferential seal 8 between the outer circumferential surface of the sensor housing 9.15 and the inner circumferential surface 51b of the cylinder 51 whereas the seal 8 seals the bottom side of the transversal plate of the sensor housing 9.15 relative to the cylinder base 51a in the right half of the figure.

It is furthermore illustrated in the left half of the figure that the sensor housing 9.15 can also be a two piece sensor housing 9.15 that forms a hollow box when assembled wherein the sensor housing then requires a cable outlet 17 for the cables 16 wherein sharp edges of the cable outlet are protected as usual by a grommet 21 made from rubber or a similar material.

The sensor 6 is arranged in this case at a bottom side of the transversal plate of the sensor housing 9.15 so that a main plane of the sensor, this its detection plane also extends in the transversal direction, advantageously perpendicular to the axial direction 51'.

Because the mechanical unit including the encoder magnet 4, the winding drum 3 etc. is arranged in the mechanical housing 9.14 that is advantageously applied to the sensor housing 9.15 so that the rotation axis 3' of the winding drum 3 is arranged parallel to the axial direction 51' this causes in particular a very small extension of the entire sensor unit 1 in the axial direction 51'.

Since the pull of direction 10 of the band 2 from the winding drum 3 is also transversal to the axial direction 51', the displacement direction of the positon 52a a deflection into the axial direction 51' is required in the pulled off portion of the band 2 and therefore the band 2 is deflected about a deflection roller 20 whose rotation axis is arranged at a 45° angle to the axial direction 51 the movement direction of the piston 52 as well as of the attachment eyelet 2a at a free end of the band 2, thus at a 45° angle to the pull off direction 10 of the band 2 from the winding drum 3.

The fifth embodiment according to FIG. 4 differs from all previous embodiments in that a mechanical housing 9.14 as well as a sensor housing 9.15 is provided but both housings are arranged completely adjacent to each other, thus none of the two housings 9.14, 9.15 extends at any axial position besides the circumferential seal 8 beyond an entire inner free cross section of the cylinder 51.

Thus the circumferential seal 8 extends over a portion of its circumference as the sectional view along the line Ib-Ib of FIG. 1b shows along the outer circumferential surface of the sensor housing 9.15 and over the larger portion along the outer circumferential surface of the mechanical housing 9.15 in a plane that is approximately orthogonal to the axial direction 51'.

This requires that the contact surface between the 2 housings 9.14 and 9.15 is sealed by an additional seal 8' that has to extend in the transversal direction to the axial direction 51' over an entire width of an interior of the cylinder 51, advantageously in the seal plane of the circumferential seal 8 up to this seal 8.

Furthermore a wall of the mechanical housing 9.14 and a wall of the sensor housing 9.15 contact each other and thus both are arranged together between the encoder magnet 4 in the mechanical cavity 14 and the sensor 5 in the sensor cavity 15.

Since a window 7 is required there between that is permeable for the magnetic field wither both walls that contact each other are sufficiently permeable for the magnetic field—optionally including the flat gasket 8' arranged there between or one of the two housing walls has a sufficiently large opening at this location wherein the opening has is in particular at least as big as the sensor 6 thus illustrated in the wall of the mechanical housing 9.14 and in the other wall permeability is provided thus by reducing the wall thickness of the wall of the sensor housing 9.15.

Besides that the winding drum 3 the flat spiral spring 4, the wound up portion of the band 2 and the bearing blocks 19a, b are arranged in the mechanical cavity 14 also in this embodiment whereas the sensor 6 is arranged in the sensor cavity 15 and the cables 16 leading from the sensor 6 terminate in a plug element 18 of the cylinder base 51a.

As already indicated in FIG. 1a signals emitted by the sensor 6 which may already include a processing unit can either be run out by cables 16 initially out of the sensor housing 9.15 and subsequently through the wall or the base 51a of the cylinder through a cable pass through or a plug element 18 or wirelessly in that the sensor 6 is connected with a transmitter 12 which is arranged like the sensor 6 in the sensor cavity 15 thus advantageously in an interior of a pot shaped sensor housing 9.15.

Figure 1E:
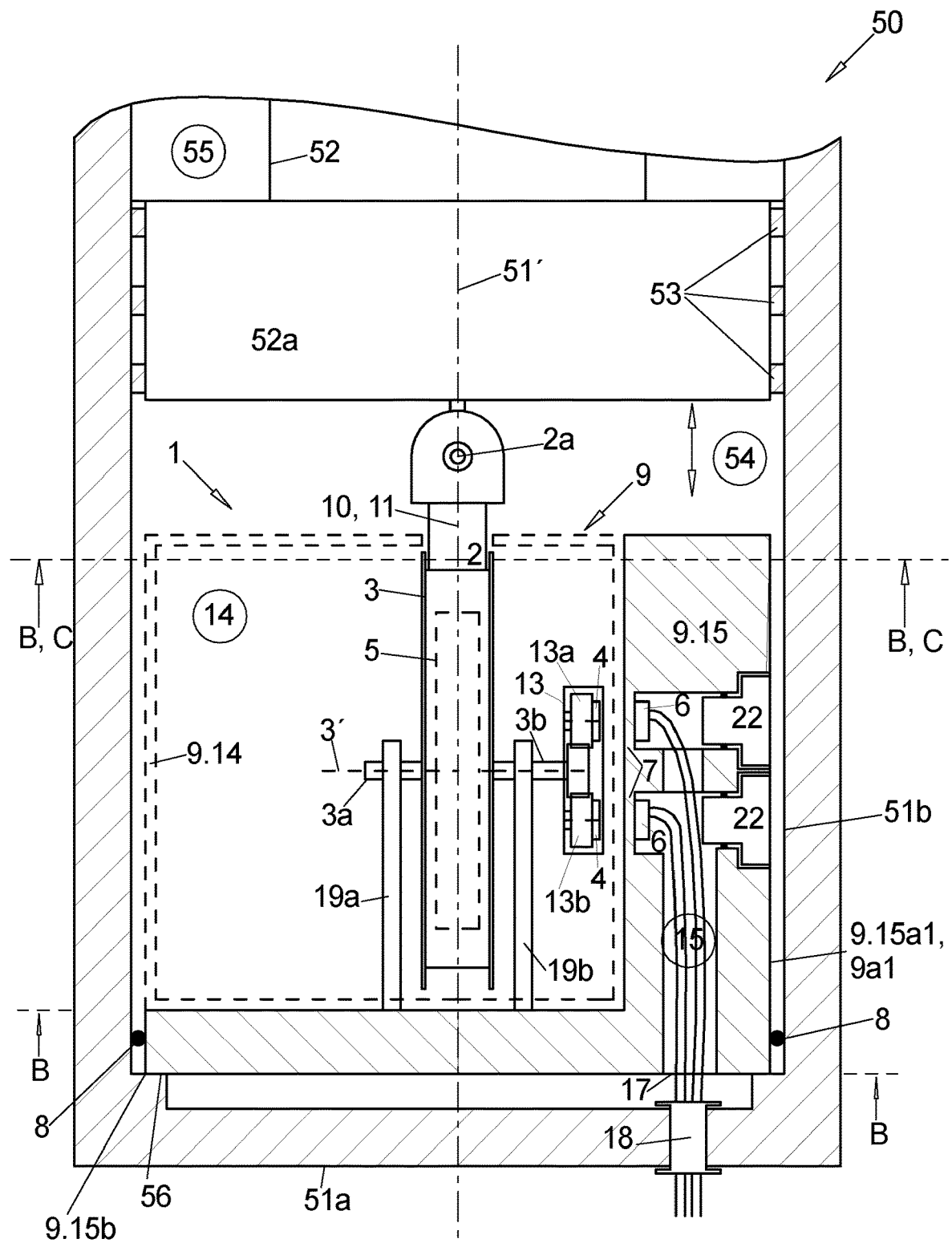
FIG. 1e illustrates a derivative of the first embodiment according to FIG. 1a with a configuration of the sensor housing that is suitable for practical applications.

FIG. 1e illustrates a principle that is more realistic than the principle of FIG. 1a of the first embodiment of a sensor unit 1 with several differences:

On the one hand side a transmission 13 is arranged in this case between the encoder magnet 4 and the winding drum 3 similar to the embodiment of FIG. 1*d* which however includes 3 gears.

Thus a center gear of the 3 gears is connected torque proof with the shaft 3*b* of the winding drum 3.

The two additional gears 13*a, b* mesh with the outer teething of the centrally arranged center gear wherein the additional gears have numbers of teeth that differ from each other, typically by only one tooth and on whose face side a respective encoder magnet is arranged.

Like in FIG. 1*d* also here each of the 2 encoder magnets 4 is respectively associated with a sensor 6 on the other side of the pressure tight wall 7 which has the advantages that were described with reference to FIG. 1*d*.

In practical applications it is appreciated that the pressure tight wall 7 which may only have a very small thickness in order to let the magnetic field of the at least on encoder magnet 4 pass through has to withstand very high pressures in an interior of the cylinder 51. Therefore it is important to keep a surface of the thin pressure tight wall 7 along its main plane as small as possible and to keep a wall thickness of the sensor housing 9.15 remote therefrom as thick as possible.

Therefore the embodiment according to FIG. 1*e* provides a distance between the 2 encoder magnets 4 through the central gear of the transmission 13 and thus a distance between the sensors 6 which provides the option that the pressure tight wall respectively only has a surface area that is hardly an greater than the sensor 6 and a wall thickness of the sensor housing 9.15 between the 2 thin walls 7 can be selected as thick and stable as necessary.

In particular a bar extends from a side of the sensor housing 9.15 in which the thin wall 7 is arranged wherein the bar extends to an opposite end of the sensor housing 9.15.

In order to be able to mount the sensors 6 at an inside of the thin wall 7 the sensor housing 9.15 is respectively open towards the opposite outside and the openings are sealed by a closure plug 22 that is insert able seal tight e.g. sealed by a circumferential O-ring seal relative to the circumferential sensor housing of the assembly of the sensors 6 is completed.

A pass through bore hole is provided in the recited bar in order to be able to pass the necessary electrical conductors 17 from one of the sensors.

Thus the sensor cavity 15 is greatly reduced in size relative to the illustration in FIG. 1*a* and only includes a space after inserting the closure plugs 22 that suffices for housing the sensors 6 and the electrical conductors 17 leading away therefrom in order to be able to size a wall thickness of the sensor housing 9.15 as thick as possible.

REFERENCE NUMERALS AND DESIGNATIONS

1 sensor unit
2 tension element band
2*a* attachment eyelet
3 winding drum
3' rotation axis
3*a, b* bearing pinion, axle
4 encoder magnet
5 flat spiral spring
6 sensor, Hall sensor
7 wall
8 seal
8' seal
9 unit housing
9*a* outer surface
9*a*1 outer circumferential surface
9*b* free circumferential outer surface
9.14 mechanical housing
9.15 sensor housing
9.15*a* outer surface
9.15*a*1 outer circumferential surface
9.15*b* face side
10 pull off direction
11 movement direction
12 transmitter
13 transmission
14 mechanical cavity
15 sensor cavity
16 cable
17 cable outlet
18 plug element
19*a, b* bearing block, bearing element
20 deflection roller
21 grommet
22
23
24
25
26
27
28
29
30 rod sensor unit
31 sensor head
32 sensor
33 piston bore hole
34
35
36
37
38
39
40
41
42
43
44
45
46
47
48
49
50 operator cylinder unit
51 cylinder
51*a* cylinder base
51*b* inner circumferential surface
51' axial direction
52 piston rod
52*a* piston
53 piston ring
54 cylinder cavity
55 cylinder cavity
56 shoulder
57 piston bore hole

The invention claimed is:

1. A sensor unit (1) for determining a position of an object that moves in a space with problematic environmental conditions, in particular high pressure, the sensor unit comprising:

a) a flexible tension element (2),
a winding drum (3) for the tension element (2), at least one encoder magnet (4) that is operatively connected with the winding drum (3), a spring (5) that preloads the winding drum (3) in a wind up direction, a magnetic field sensitive sensor (6) in a magnetic operating range of the encoder magnet (4), a pressure tight planar wall (7) between the encoder magnet (4) and the sensor (6) which separates a sensor cavity (15) in which the sensor (6) is arranged from a mechanical cavity (14), characterized in that b) the sensor unit (1) includes a unit housing (9) which includes at least a sensor housing (9.15) about the sensor cavity (15) with the sensor (6) included therein and a mechanical housing (9.14) about the mechanical cavity (14) and about the winding drum (3), the encoder magnet (4) and the spring (5) being inside the mechanical cavity (3), c) the sensor housing (9.15) and the mechanical housing (9.14) are connectable or connected to each other to be handled together as the unit housing (9), d) wherein the wall (7) forms part of a wall of the sensor housing (9.15) or of the mechanical housing (9.14), e) the sensor unit (19) comprises a first seal (8) on an outer surface (9a1) of the sensor housing (9.15) or of the mechanical housing (9.14), wherein the first seal (8) is neither inside the sensor cavity (15) nor inside the mechanical cavity (14) and not arranged between the sensor housing (9.15) and the mechanical housing (9.14), wherein the mechanical cavity (14) further includes a transmission (13) between the winding drum (3) and the encoder magnet (4) having a transmission ratio which deviates from a value of 1.000, wherein:

the transmission ratio deviates from the value of 1.000 at the most by 0.05, and when two meshing gears (13a, b) form the transmission (13) the numbers of teeth of the two gears (13a, b) only deviate by one tooth, on each of the two gears (13a, b), on their face sides, a respective encoder magnet (4) of the at least one encoder magnet is arranged and a respective sensor (6) is arranged in a magnetic operating range on another side of the wall (7).

2. The sensor unit (1) according to claim 1, characterized in that the first seal (8) is arranged only on an outer surface (9a1) of the sensor housing (9.15) and does not contact the mechanical housing (9.14).

3. The sensor unit (1) according to claim 1, characterized in that the first seal (8) is arranged only on the outer surface (9a1) of the mechanical housing (9.14) and does not contact the sensor housing (9.15).

4. The sensor unit (1) according to claim 1, characterized in that the first seal (8) is arranged on the outer circumferential surface of the unit housing (9) so that the seal extends over a divider plane between the mechanical housing (9.14) and the sensor housing and is in some part of a circumference of the circumferential surface of the unit housing not in contact with the sensor housing (9.15) and is in some different part of the circumference not in contact with the mechanical housing (9.14).

5. The sensor unit (1) according to claim 1, characterized in that a seal plane in which the first seal (8) is arranged is configured at a right angle to the pressure tight wall (7).

6. The sensor unit (1) according to claim 1, characterized in that a seal plane in which the first seal (8) is arranged extends parallel to the wall (7).

7. The sensor unit (1) according to claim 1, characterized in that the first seal (8) is an O-ring seal.

8. The sensor unit (1) according to claim 1, characterized in that the sensor housing (9.15) includes a transmitter (12) for transmitting wirelessly signals of the sensor.

9. The sensor unit (1) according to claim 1, characterized in that the sensor housing (9.15) includes an electrical cable (16) and a cable outlet (17) out of the sensor housing (9.15) is arranged in a face of the sensor housing (9.15).

10. The sensor unit (1) according to claim 9, characterized in that the electrical cable (16) terminates in a plug element (18).

11. An operating cylinder unit (50) comprising:

a cylinder (51), a piston rod (52) axially supported in the cylinder which supports a piston (52a), wherein the piston (52a) or the piston rod (52) are axially moveable close to an inner surface of the cylinder (51) and wherein the piston divides an inner cavity of the cylinder (51) in two cylinder cavities (54, 55), which are typically loaded by an operating pressure and are therefore configured as high pressure cavities, wherein the cylinder (51) comprises a cylinder base (51) and a cylinder wall (51) connected to the cylinder base, wherein the cylinder wall has an inner circumferential surface (51b), characterized in that a sensor unit (1) is arranged in an end portion of the cylinder (51) completely within the cylinder (51), between the cylinder base and the piston and within the inner circumferential surface (51) of the cylinder wall and within one of the two cylinder cavities (54 55), wherein the sensor unit comprises:

a) a flexible tension element (2), a winding drum (3) for the tension element (2), at least one encoder magnet (4) that is operatively connected with the winding drum (3), a spring (5) that preloads the winding drum (3) in a wind up direction, a magnetic field sensitive sensor (6) in a magnetic operating range of the encoder magnet (4), a pressure tight planar wall (7) between the encoder magnet (4) and the sensor (6) which separates a sensor cavity (15) in which the sensor (6) is arranged from a mechanical cavity (14), b) the sensor unit (1) includes a unit housing (9) which includes at least a sensor housing (9.15) about the sensor cavity (15) with the sensor (6) included therein and a mechanical housing (9.14) about the mechanical cavity (14) and about the winding drum (3), the encoder magnet (4) and the spring (5) being inside the mechanical cavity (3), c) the sensor housing (9.15) and the mechanical housing (9.14) are connectable or connected to each other to be handled together as the unit housing (9), e) wherein the wall (7) forms part of a wall of the sensor housing (9.15) and/or of the mechanical housing (9.14), d) the sensor unit (1) comprises a first seal (8) on an outer surface (9a1) of the sensor housing (9.15) and/or of the mechanical housing (9.14), wherein the first seal (8) is neither inside the sensor cavity (15) nor inside the mechanical cavity (14) and not arranged between the sensor housing (9.15) and the mechanical housing (9.14), wherein a diameter of the unit housing (9) is smaller than a diameter of the inner circumferential surface, the first seal (8) of the sensor unit (1) is arranged sealed tight at the inner circumferential surface (51b) as an inside of the cylinder wall and divides the corresponding cylinder cavity (54, 55) of the cylinder (51) in two spaces that are separated from each other pressure tight, wherein one space of the two spaces is a high pressure space and is connected with the mechanical cavity 14 of the sensor unit (1), and another space of the two spaces is a low pressure space that is advantageously connected with an ambient outside of the cylinder 51 is connected with the sensor cavity (15) in which the sensor (6) is arranged.

12. The operating cylinder according to claim 11, characterized in that cables (16) are run from the sensor (6) out of the sensor housing (9.15) which envelop the sensor cavity (15) and either terminate in a plug element (18) that is either arranged in the cylinder wall or the cylinder base (51), in particular of the low pressure space, or run through a cable pass through (17) that is arranged at this location.

\* \* \* \* \*